United States Patent
Takahashi et al.

(10) Patent No.: US 10,098,045 B2
(45) Date of Patent: Oct. 9, 2018

(54) RADIO COMMUNICATION DEVICE AND COMMUNICATION CONTROL METHOD

(71) Applicant: Panasonic Corporation, Osaka (JP)

(72) Inventors: Hiroshi Takahashi, Kanagawa (JP); Naganori Shirakata, Kanagawa (JP)

(73) Assignee: PANASONIC CORPORATION, Osaka (JP)

( * ) Notice: Subject to any disclaimer, the term of this patent is extended or adjusted under 35 U.S.C. 154(b) by 135 days.

(21) Appl. No.: 15/012,613

(22) Filed: Feb. 1, 2016

(65) Prior Publication Data

US 2016/0277976 A1 Sep. 22, 2016

(30) Foreign Application Priority Data

Mar. 19, 2015 (JP) ................. 2015-056691

(51) Int. Cl.
| | | |
|---|---|---|
| *H04W 36/00* | (2009.01) | |
| *H04B 7/06* | (2006.01) | |
| *H04W 36/38* | (2009.01) | |
| *H04W 36/30* | (2009.01) | |

(52) U.S. Cl.
CPC ...... *H04W 36/0027* (2013.01); *H04B 7/0617* (2013.01); *H04B 7/0695* (2013.01); *H04W 36/30* (2013.01); *H04W 36/38* (2013.01)

(58) Field of Classification Search
CPC . H04W 36/0027; H04W 36/38; H04W 36/30; H04B 7/0695; H04B 7/0617
See application file for complete search history.

(56) References Cited

U.S. PATENT DOCUMENTS

| | | | |
|---|---|---|---|
| 2006/0030323 A1 | 2/2006 | Ode et al. | |
| 2009/0190553 A1 | 7/2009 | Masuda et al. | |
| 2012/0320763 A1* | 12/2012 | Hong | H04B 5/0081 370/246 |
| 2013/0083774 A1 | 4/2013 | Son et al. | |
| 2015/0215077 A1* | 7/2015 | Ratasuk | H04B 7/0623 455/436 |

(Continued)

FOREIGN PATENT DOCUMENTS

| | | |
|---|---|---|
| JP | 2011-004225 | 1/2011 |
| JP | 2014-531852 A | 11/2014 |

(Continued)

*Primary Examiner* — Min Jung
(74) *Attorney, Agent, or Firm* — Seed IP Law Group LLP

(57) ABSTRACT

The present disclosure provides a radio communication device including a communication processor that connects to at least one first radio terminal through radio communication using beam forming, an information sharer that acquires first connection information including a connection situation of one or more second radio terminals connected to a second radio communication device, a switch determiner that determines whether or not to switch a connection destination of the at least one first radio terminal from the radio communication device to the second radio communication device in reference to the first connection information, and a connection switcher that, when the switch determiner determines to switch the connection destination, switches the connection destination of the at least one first radio terminal from the radio communication device to the second radio communication device.

9 Claims, 9 Drawing Sheets

(56) References Cited

U.S. PATENT DOCUMENTS

| | | | |
|---|---|---|---|
| 2015/0365814 A1* | 12/2015 | El Ayach | H04W 16/28 370/254 |
| 2015/0373607 A1* | 12/2015 | Zhu | H04W 36/22 370/331 |
| 2016/0080060 A1* | 3/2016 | Yu | H04B 7/0626 455/452.2 |
| 2016/0100347 A1* | 4/2016 | Ryu | H04W 76/026 455/445 |
| 2016/0183242 A1* | 6/2016 | Cordeiro | H04W 16/32 370/331 |
| 2016/0242159 A1* | 8/2016 | Ho | H04W 72/046 |
| 2016/0249269 A1* | 8/2016 | Niu | H04W 56/0095 |

FOREIGN PATENT DOCUMENTS

| | | | |
|---|---|---|---|
| WO | 2004/112419 A1 | 12/2004 | |
| WO | 2007/142199 A1 | 12/2007 | |

\* cited by examiner

| DEVICE ID | TERMINAL ID | TRANSMISSION SECTOR | RSSI AT TIME OF TRANSMISSION IN EACH SECTOR | | | | | RECEPTION SECTOR | RSSI AT TIME OF RECEPTION IN EACH SECTOR | | | | |
|---|---|---|---|---|---|---|---|---|---|---|---|---|---|
| | | | SECTOR 1 | SECTOR 2 | SECTOR 3 | SECTOR 4 | SECTOR 5 | | SECTOR 1 | SECTOR 2 | SECTOR 3 | SECTOR 4 | SECTOR 5 |
| AP1 | STA1 | SECTOR 1 | 15 | 10 | 10 | 9 | 3 | SECTOR 1 | 15 | 10 | 10 | 9 | 3 |
| | STA2 | SECTOR 4 | 6 | 7 | 10 | 15 | 12 | SECTOR 4 | 6 | 7 | 10 | 15 | 12 |
| | STA3 | SECTOR 4 | 5 | 6 | 7 | 14 | 13 | SECTOR 4 | 5 | 6 | 7 | 14 | 13 |

| DEVICE ID | TERMINAL ID | TRANSMISSION SECTOR | RSSI AT TIME OF TRANSMISSION IN EACH SECTOR | | | | | RECEPTION SECTOR | RSSI AT TIME OF RECEPTION IN EACH SECTOR | | | | |
|---|---|---|---|---|---|---|---|---|---|---|---|---|---|
| | | | SECTOR 1 | SECTOR 2 | SECTOR 3 | SECTOR 4 | SECTOR 5 | | SECTOR 1 | SECTOR 2 | SECTOR 3 | SECTOR 4 | SECTOR 5 |
| AP1 | STA1 | SECTOR 1 | 15 | 10 | 10 | 9 | 3 | SECTOR 1 | 15 | 10 | 10 | 9 | 3 |
| | STA2 | SECTOR 4 | 6 | 7 | 10 | 15 | 12 | SECTOR 4 | 6 | 7 | 10 | 15 | 12 |
| | STA3 | SECTOR 4 | 5 | 6 | 7 | 14 | 13 | SECTOR 4 | 5 | 6 | 7 | 14 | 13 |
| AP2 | | | | | | | | | | | | | |
| AP3 | STA4 | SECTOR 2 | 10 | 14 | 10 | 8 | 6 | SECTOR 2 | 10 | 14 | 10 | 8 | 6 |
| | STA5 | SECTOR 4 | 6 | 8 | 10 | 14 | 10 | SECTOR 4 | 6 | 8 | 10 | 14 | 10 |

541 542 543 544 545 546

540₁ 540₂ 540₃

RADIO COMMUNICATION DEVICE AND COMMUNICATION CONTROL METHOD

BACKGROUND

1. Technical Field

The present disclosure relates to a radio communication device that connects to a radio terminal as one of a plurality of access points to a communication network through radio communication using beam forming, and a communication control method.

2. Description of the Related Art

Millimeter wave communication, which requires no license and uses radio signals in the 60-GHz band while enabling high-speed communication, has been receiving attention in recent years.

Examples of major standards for wireless local area network (LAN) and wireless personal area network (PAN), which employ the millimeter wave communication, include Wireless Gigabit (WiGig), IEEE 802.15.3c, wireless high definition (WirelessHD), ECMA-387, and IEEE 802.11ad.

A millimeter wave band signal has radio-wave characteristics, which exhibit high linearity and large spatial attenuation. Thus, in many cases of the millimeter wave communication, which involves the above-described standards, beam forming techniques are used to control the directivity of the radio communication using a plurality of antennas.

Such beam forming techniques control the direction or width of a beam, which constitutes a communication area having directivity, and cause the beam to follow the position of a radio terminal, which is a communication partner. When a plurality of radio terminals are present in a range where a beam can be formed, which is hereinafter referred to as a "cell", a millimeter wave communication device that uses the beam forming techniques connects to a plurality of radio terminals by switching the direction of the beam through time division.

The millimeter wave communication device can be used as a wireless access point to a communication network, such as the Internet. In this case, however, how to perform the handover of a radio terminal among a plurality of cells, that is, how to switch a connection destination matters.

Techniques for achieving high-speed roaming in non-directional communication are described in, for example, Japanese Unexamined Patent Application Publication No. 2011-4225. According to the techniques described in Japanese Unexamined Patent Application Publication No. 2011-4225, which are hereinafter referred to as the "conventional techniques", an access point notifies information on another access point present on the periphery, such as a radio channel, a basic service set identification (BSSID), or an extended service set identification (ESSID), which is being used, to a radio terminal connecting to the access point. In reference to the notified information, the radio terminal narrows radio channels to be scanned at the time of roaming to another access point.

Such conventional techniques can reduce time needed for connection to another access point and enables handover to be performed at high speed.

When many radio terminals are present, an area with local concentration of radio terminals may be caused inside a whole communication area. In such a case, an access point near the area where the radio terminals are concentrated suffers heavy load and the communication quality of the radio terminal connecting to the access point decreases. Besides, when the radio terminals are concentrated in a direction inside a cell in the millimeter wave communication using the beam forming, multiplexing through frequency division or the like is necessary for a beam in the direction and the communication quality may further decrease.

Even when the connection destinations of the radio terminals are switched in such a situation, there may be more radio terminals at the switch destination access point. In addition, the beam at the switch destination access point may be used by more radio terminals. That is, the conventional techniques have an issue that, when local concentration of radio terminals occurs, particularly in the millimeter wave communication using a plurality of access points, the communication quality may decrease notably.

SUMMARY

One non-limiting and exemplary embodiment provides a radio communication device and a communication control method, which can suppress decrease in communication quality even when local concentration of radio terminals occurs in millimeter wave communication using a plurality of access points.

In one general aspect, the techniques disclosed here feature a radio communication device including: a communication processor that connects to at least one first radio terminal through radio communication using beam forming; an information sharer that acquires first connection information including a connection situation of one or more second radio terminals connected to a second radio communication device; a switch determiner that determines whether or not to switch a connection destination of the at least one first radio terminal from the radio communication device to the second radio communication device in reference to the first connection information; and a connection switcher that, when the switch determiner determines to switch the connection destination, switches the connection destination of the at least one first radio terminal from the radio communication device to the second radio communication device.

According to an aspect of the present disclosure, decrease in communication quality can be suppressed even when local concentration of radio terminals occurs in millimeter wave communication using a plurality of access points.

It should be noted that general or specific embodiments may be implemented as a system, a method, an integrated circuit, a computer program, a storage medium, or any selective combination thereof.

Additional benefits and advantages of the disclosed embodiments will become apparent from the specification and drawings. The benefits and/or advantages may be individually obtained by the various embodiments and features of the specification and drawings, which need not all be provided in order to obtain one or more of such benefits and/or advantages.

BRIEF DESCRIPTION OF THE DRAWINGS

FIG. 6 illustrates contents of a terminal management table according to the embodiment as an example;

FIG. 7 illustrates contents of an integrated terminal management table according to the embodiment as an example.

DETAILED DESCRIPTION

An embodiment of the present disclosure is described in detail below with reference to the drawings.

[Configuration of System]

First of all, a configuration of a communication system 100 according to the embodiment of the present disclosure is described.

Figure 1:
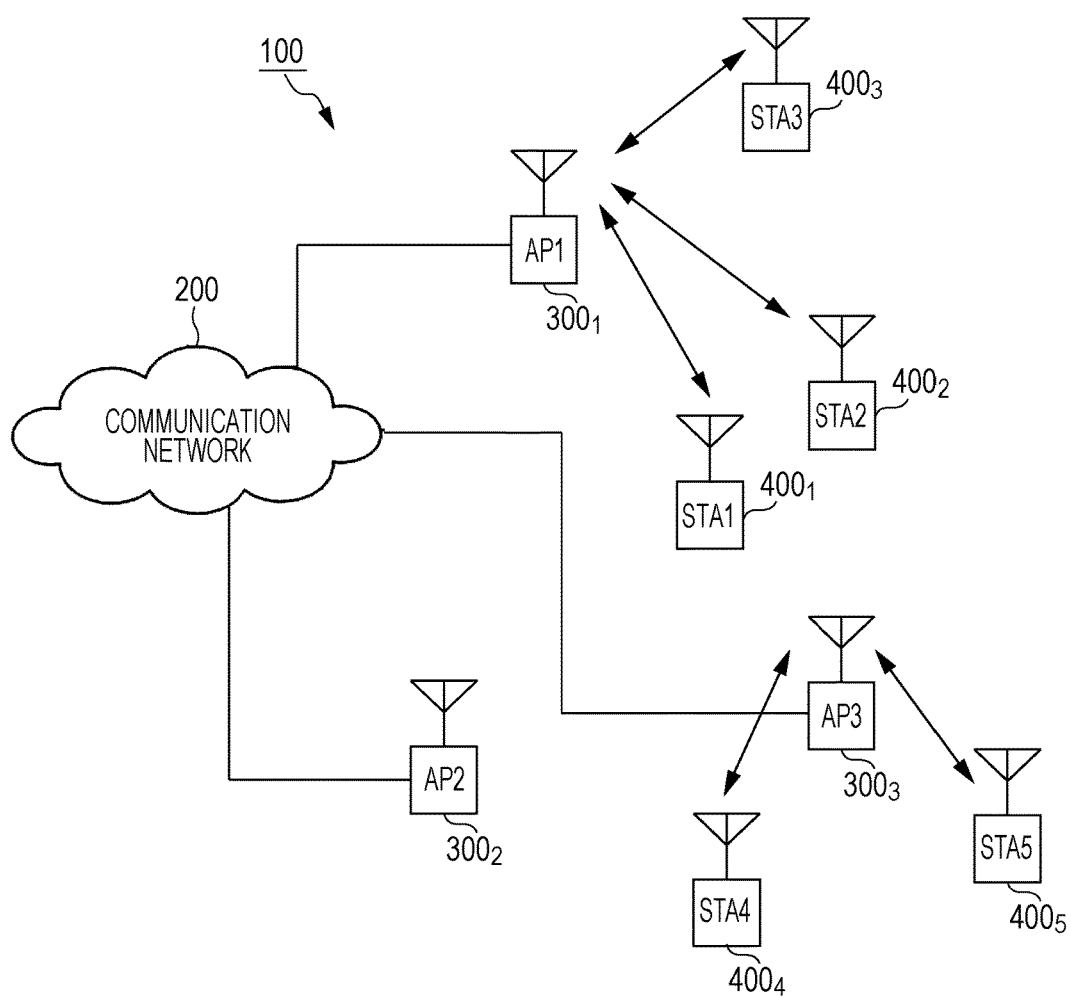
FIG. 1 illustrates an example of a configuration of a communication system including a radio communication device according to an embodiment of the present disclosure.

FIG. 1 is a system configuration diagram illustrating an example of the configuration of the communication system 100, which includes radio communication devices $300_1$ to $300_3$ according to the present embodiment.

As illustrated in FIG. 1, the communication system 100 includes a communication network 200, such as the Internet, the first to third radio communication devices $300_1$ to $300_3$ connected to the communication network 200, and first to fifth radio terminals $400_1$ to $400_5$.

Since the first to third radio communication devices $300_1$ to $300_3$ have identical configurations, the first to third radio communication devices $300_1$ to $300_3$ are inclusively described as "the radio communication devices 300" when suitable. Since the first to fifth radio terminals $400_1$ to $400_5$ have identical configurations, the first to fifth radio terminals $400_1$ to $400_5$ are inclusively described as "the radio terminals 400" when suitable.

The radio communication device 300 and the radio terminal 400 are communication devices in conformity with Wireless Gigabit (WiGig), which is a millimeter wave communication standard. The radio communication device 300 functions as an access point to the communication network 200 for the radio terminal 400. More specifically, the radio communication device 300 connects to the radio terminal 400 through beam forming radio communication with the radio terminal 400 and performs data transfer between the radio terminal 400 and the communication network 200. That is, the first to third radio communication devices $300_1$ to $300_3$ manage access of the first to fifth radio terminals $400_1$ to $400_5$ to the communication network 200 as a whole.

FIG. 1 illustrates a state in which the first radio communication device $300_1$ is connected to the first to third radio terminals $400_1$ to $400_3$, the second radio communication device $300_2$ is connected to none of the first to fifth radio terminals $400_1$ to $400_5$, and the third radio communication device $300_3$ is connected to the fourth and fifth radio terminals $400_4$ and $400_5$.

For example, the first to third radio communication devices $300_1$ to $300_3$ and the first to fifth radio terminals $400_1$ to $400_5$ use an identical radio channel. For example, the first to third radio communication devices $300_1$ to $300_3$ and the first to fifth radio terminals $400_1$ to $400_5$, which are hereinafter referred to as the "communication devices" collectively when suitable, are configured so that the beam pattern to be formed is switchable among a plurality of identical beam patterns. Herein, the "beam pattern" indicates the size and shape (pattern) that a communication device can form at a time and is defined by, for example, a beam direction and a half-beam angle (beam width).

Figure 2:
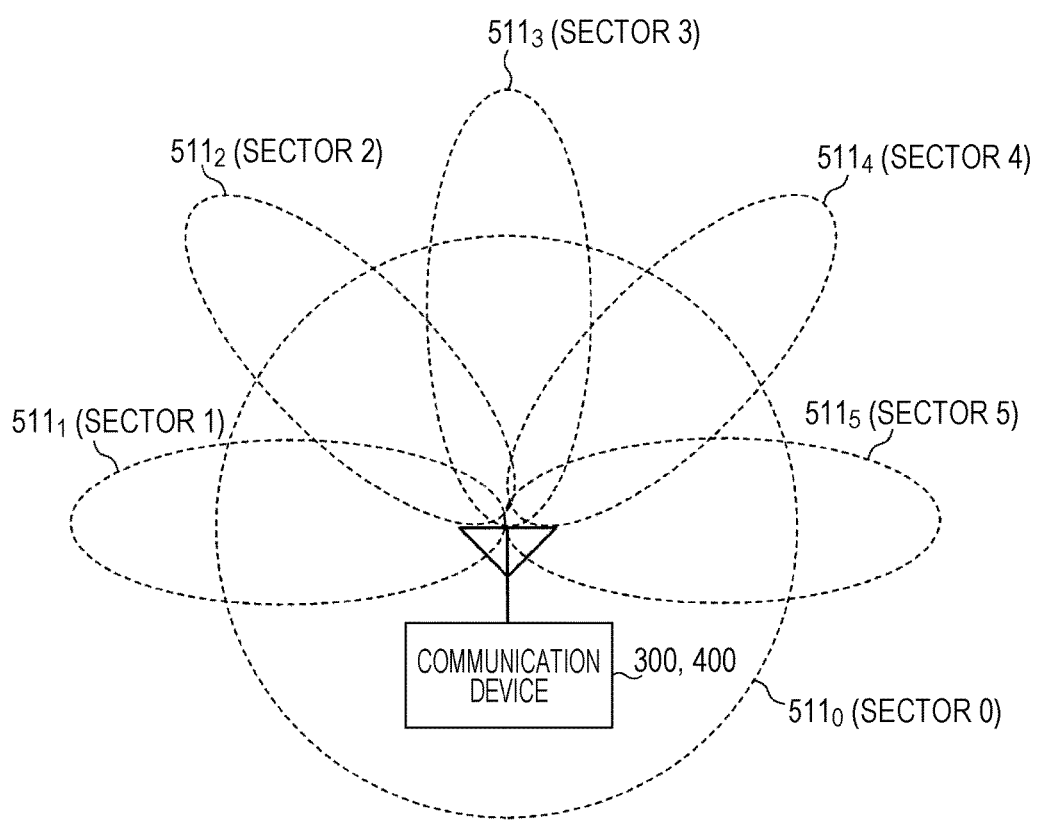
FIG. 2 illustrates examples of a beam pattern formed by a communication device according to the embodiment.

FIG. 2 illustrates examples of the beam pattern formed by each communication device 300 or 400.

As illustrated in FIG. 2, the communication device 300 or 400 switches a beam to be formed among zeroth to fifth beam patterns $511_0$ to $511_5$ using an array antenna or the like. Herein, the "beam" indicates a range (communication area) in which the transmission and reception of a radio signal are possible and is formed by, for example, controlling the transmission and reception of the array antenna. The zeroth beam pattern is a non-directional beam pattern. The first to fifth beam patterns $511_0$ to $511_5$ are beam patterns with high directivity, which are different in beam direction.

For example, when a communication partner is positioned inside the first beam pattern $511_1$, the communication device 300 or 400 performs radio communication with the communication partner by forming the first beam pattern $511_1$.

Which one of the beam patterns is optimal for the radio communication with the communication partner is unknown in the initial state in which the communication is initiated. Accordingly, the communication device 300 or 400 determines a usable beam pattern for each communication partner by performing a beam forming protocol and determines the beam pattern to be used for the radio communication with the communication partner. The beam forming protocol is described in detail below.

The communication device 300 or 400 may use the same beam pattern or different beam patterns as the beam pattern at the time of transmission, also referred to as the transmission sector, and the beam pattern at the time of reception, also referred to as the reception sector.

In the description below, when suitable, AP1 to AP3 are used as identification information on the first to third radio communication devices $300_1$ to $300_3$, respectively, and STA1 to STA5 are used as identification information on the first to fifth radio terminals $400_1$ to $400_5$, respectively. Further, the zeroth to fifth beam patterns $511_0$ to $511_5$ are referred to as sectors 0 to 5, respectively, when suitable.

At least part of the cell of the first radio communication device $300_1$ is assumed to overlap at least part of each of the cells of the second radio communication device $300_2$ and the third radio communication device $300_3$.

[Configuration of Device]

A configuration of the radio communication device 300 is described next.

Figure 3:
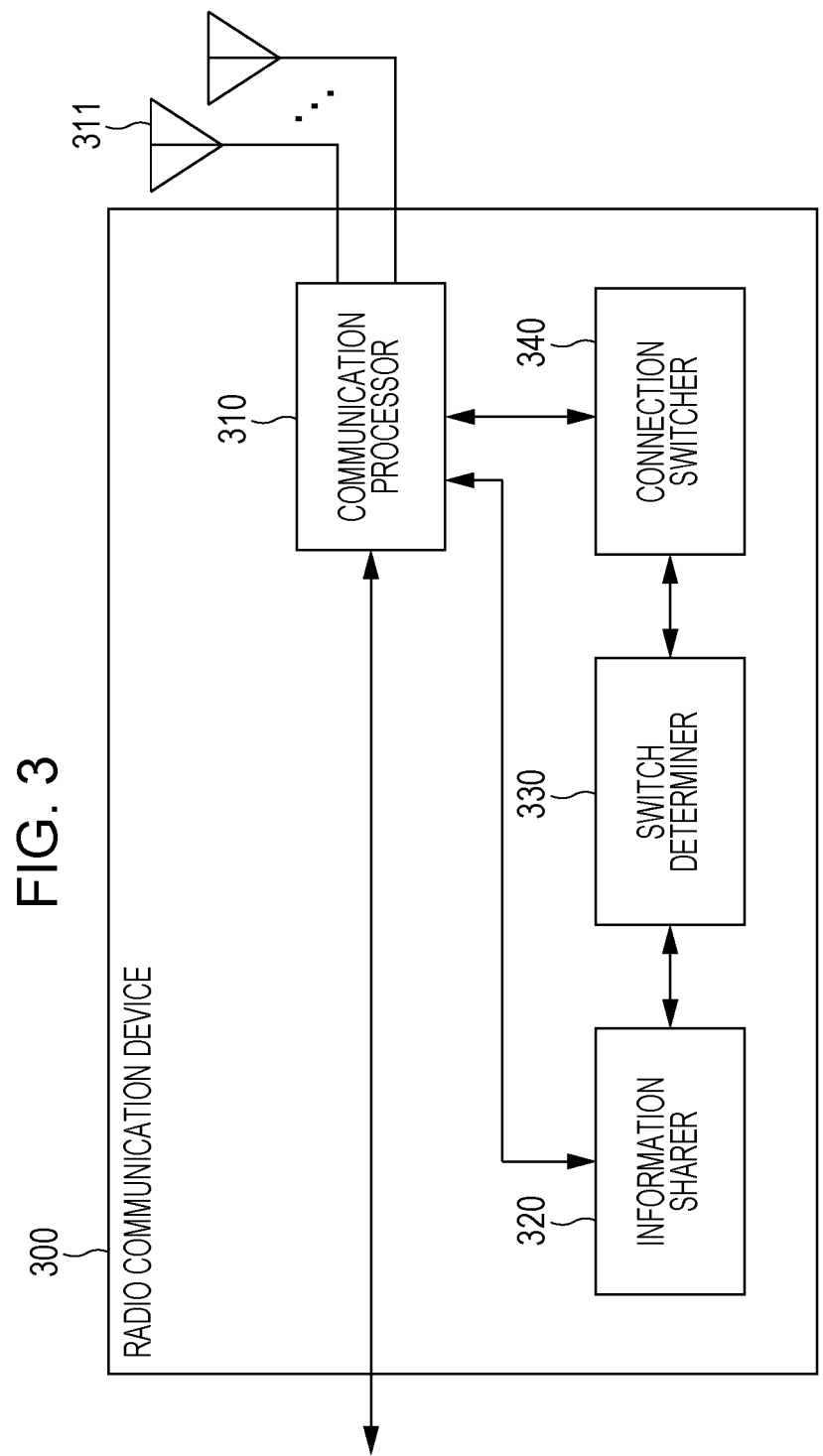
FIG. 3 illustrates an example of a configuration of the radio communication device according to the embodiment.

FIG. 3 is a block diagram that illustrates an example of the configuration of the radio communication device 300.

In FIG. 3, the radio communication device 300, which is also referred to as the self radio communication device 300, includes a communication processor 310, an information sharer 320, a switch determiner 330, and a connection switcher 340.

The communication processor 310 performs beam forming using an array antenna 311 and connects to at least one radio terminal 400, which is also referred to as the first radio terminal, through radio communication with the radio terminal 400. More specifically, the communication processor 310 performs sector level sweep (SLS), which is a beam forming protocol specified with WiGig, and determines which beam pattern 511 (see FIG. 2) is used for the connection with which radio terminal 400.

After that, the communication processor 310 outputs self device information, which indicates which beam pattern 511 is used for the connection with which radio terminal 400 and indicates the quality of the radio communication with the radio terminal 400, to the information sharer 320. The self device information is, in other words, connection information in the communication processor 310, which indicates a situation of the connection with the radio terminal 400 and is also referred to as the second connection information.

The communication processor 310 connects to the communication network 200 using a network-side communicator, not illustrated, and performs data transfer between the radio terminal 400 and the communication network 200 that are connected to each other. That is, the communication processor 310 functions as one of a plurality of access points to the communication network 200 for the radio terminal 400.

The communication processor 310 performs radio communication or wire communication with another radio communication device 300, which is also referred to as the second radio communication device or "the other device" 300 hereinafter when suitable. The communication with the other device 300 may be millimeter wave communication, which uses the array antenna 311, may be communication through Ethernet (registered trademark), an optical fiber, or a wireless LAN, which uses a network-side communicator, or may be visible light communication, which uses another communication device for example.

When instructed by the other device 300 to execute masquerade SLS, the communication processor 310 executes the masquerade SLS on the radio terminal 400 connecting to the other device 300, which is also referred to as the second radio terminal, in accordance with the instruction. After that, the communication processor 310 reports a result of the masquerade SLS to the other device 300 that has made the instruction.

Herein, the "masquerade SLS" indicates a process of performing SLS specified with WiGig by masquerading as the communication processor 310 of the other device 300 that has made the instruction.

The information sharer 320 acquires and records the self device information output from the communication processor 310, and transmits the acquired self device information to the other device 300 through the communication processor 310.

Further, the information sharer 320 acquires information on the other device 300 indicating a situation of the connection between the other device 300 and the radio terminal 400 as the other device information, which is also referred to as the first connection information, from the other device 300 through the communication processor 310 and records the other device information that has been acquired.

Each of the self device information and the other device information indicates the situation of the connection between the radio terminal 400 and one of the radio communication devices 300 as the connection information. Accordingly, the self device information and the other device information are collectively referred to as the "device information" when suitable. The information sharer 320 causes the device information to be recorded in, for example, a terminal management table stored in the information sharer 320. The terminal management table is described in detail below.

The switch determiner 330 determines whether or not to switch the connection destination of the radio terminal 400 currently connecting to the radio communication device (self radio communication device) 300, which is also referred to as the "connecting terminal" 400 hereinafter when suitable, to the other device 300. At this time, the switch determiner 330 determines of which connecting terminal 400 the connection destination is switched and to which one of the other devices 300 the connection destination of the determined connecting terminal 400 is switched. Criteria in determining the switch is described in detail below.

On determining to switch the connection destination of the connecting terminal 400 to the other device 300, the switch determiner 330 notifies switch determination information to the connection switcher 340. Herein, the "switch determination information" indicates the connecting terminal 400 whose connection destination is determined to be switched, also referred to as the "switch source candidate terminal" 400 hereinafter when suitable, and the other device 300 determined as the switch destination, also referred to as the "switch destination candidate device" 300 hereinafter when suitable.

The connection switcher 340 switches the connection destination of the connecting terminal 400 to the switch destination candidate device 300 when the switch determination information is output from the switch determiner 330. The connection switcher 340 instructs the execution of the masquerade SLS on the switch destination candidate device 300 for the connecting terminal 400. After that, the connection switcher 340 switches the connection destination of the connecting terminal 400 to the switch destination candidate device 300 on condition that the masquerade SLS has succeeded.

When the masquerade SLS has failed, the connection switcher 340 notifies the switch determiner 330 of the failure and may request change in the switch destination candidate device 300 or the switch source candidate terminal 400.

For example, the radio communication device 300 includes a central processing unit (CPU), storage medium storing a control program, such as read only memory (ROM), working memory, such as random access memory (RAM), and a communication circuit, which are not illustrated. In this case, each of the functions of the above-described constituents is implemented by the CPU executing the control program.

The radio communication device 300 with such a configuration can switch the connection destination of the radio terminal 400 on the basis of distribution of the connection of the radio terminals 400 at the plurality of access points, that is, the connection situation of the radio terminals 400 at each access point.

That is, for example, when many of the radio terminals 400 are connecting to one of the radio communication devices 300 while causing concentration, the radio communication device 300 may switch the connection destinations of part of the radio terminals 400 to another one of the radio communication devices 300 to which the less radio terminals 400 are connecting.

Thus, the radio communication device 300 can switch the connection destinations of the radio terminals 400 among, for example, the plurality of access points, that is, the plurality of radio communication devices 300 so that the numbers of connections (the connection distribution) of the radio terminals 400 can be made even.

[Beam Forming Protocol]

The beam forming protocol is described in detail below. Described now is the SLS, which is a beam forming protocol specified with WiGig.

The communication processor 310 broadcasts a beacon signal into a cell regularly, which includes identification information on the radio communication device 300. The radio terminal 400 that receives the beacon signal and attempts to start accessing the communication network 200 designates the identification information on the radio communication device 300 and transmits a connection request signal that includes identification information on the radio terminal 400. The communication processor 310 receives the connection request signal and executes the SLS when the connection is permitted through an authentication process by the communication processor 310 or another access management device, which is not illustrated.

The SLS includes transmit sector sweep, which is a process of determining a transmission sector (the beam pattern used at the time of transmission) and is also referred to as TXSS, and receive sector sweep, which is a process of determining a reception sector (the beam pattern used at the time of reception) and is also referred to as RXSS.

Figure 4:
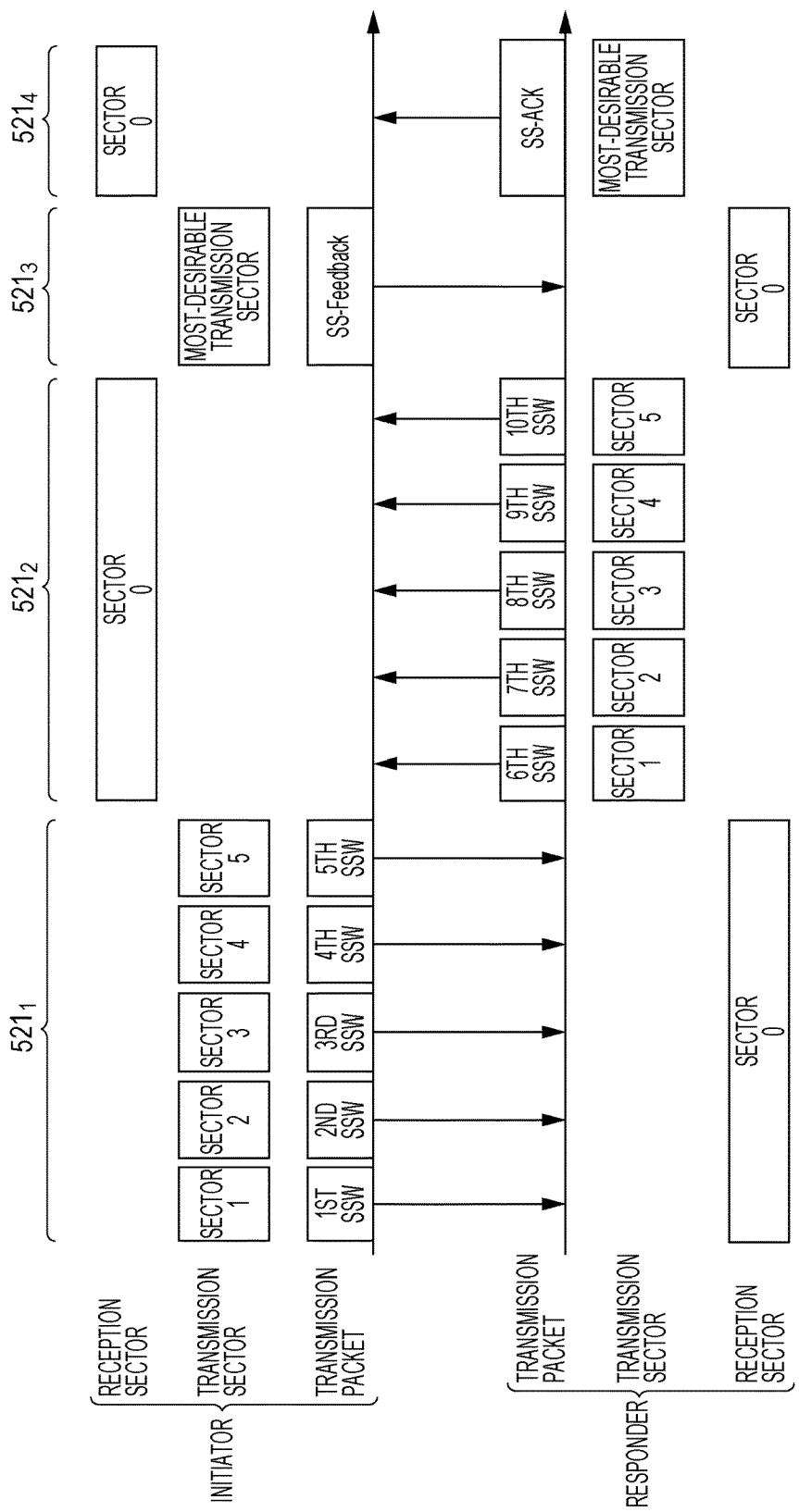
FIG. 4 illustrates how transmit sector sweep (TXSS) according to the embodiment is performed as an example.

FIG. 4 illustrates how the TXSS is performed as an example. In FIG. 4, the upper lateral portion indicates a process of the radio communication device 300 or the radio terminal 400, which initiates the beam forming protocol and is hereinafter referred to as the "initiator", and the lower lateral portion indicates a process of the radio communication device 300 or the radio terminal 400, which is a partner of the initiator in the beam forming protocol and is hereinafter referred to as the "responder". In FIG. 4, the lateral axis serves as a time axis.

As illustrated in FIG. 4, first of all in a first period $521_1$, the initiator sequentially transmits SSW packets including sector identification (ID) information, which indicates which sector (which beam pattern) is being used, while switching the transmission sector of the initiator among the sectors 1 to 5 (see FIG. 2) with high directivity. That is, the initiator transmits first to fifth SSW packets in the sectors 1 to 5, respectively.

The responder causes the reception sector of the responder to be the non-directional sector 0 (see FIG. 2) and measures the respective reception reception qualities of the first to fifth SSW packets. The measured reception quality includes, for example, reception power, received signal strength indication (RSSI), a signal-to-noise ratio (SNR) or a signal-to-interference noise ratio (SINR).

After that, in a second period $521_2$, the responder sequentially transmits SSW packets including sector identification (ID) information, which indicates which sector (which beam pattern) is being used, while switching the transmission sector of the responder among the sectors 1 to 5 (see FIG. 2) with high directivity. That is, the responder transmits sixth to tenth SSW packets in the sectors 1 to 5, respectively.

The initiator causes the reception sector of the initiator to be the non-directional sector 0 (see FIG. 2) and measures the respective reception qualities of the sixth to tenth SSW packets, such as the reception power, RSSI, SNR, or SINR.

The responder causes the sixth SSW packet to include the sector identification information on the transmission sector used in transmitting the SSW packet with the highest reception quality, which is one of the first to fifth SSW packets and hereinafter referred to as the "most-desirable transmission sector", and to include the quality information indicating the respective reception qualities of the SSW packets.

After that, in a third period $521_3$, the initiator transmits a sector sweep feedback (SS-Feedback) packet using the most-desirable transmission sector notified from the responder on the basis of the sixth SSW packet. Further, the responder receives the SS-Feedback packet using the sector 0.

The initiator causes the SS-Feedback packet to include the sector identification information on the transmission sector used in transmitting the SSW packet with the highest reception quality (the most-desirable transmission sector), which is one of the sixth to tenth SSW packets, and to include the quality information indicating the respective reception qualities of the SSW packets.

Lastly, in a fourth period $521_4$, the responder transmits a sector sweep acknowledge (SS-ACK) packet using the most-desirable transmission sector notified from the initiator on the basis of the SS-Feedback packet. Further, the initiator receives the SS-ACK packet using the sector 0.

In this manner, the radio communication device 300 or the radio terminal 400 determines the most-desirable transmission sector for the communication between the radio communication device 300 and the radio terminal 400 through the TSXX, and determines the determined most-desirable transmission sector as the transmission sector used in transmitting a radio signal to the radio communication device 300 or the radio terminal 400.

Figure 5:
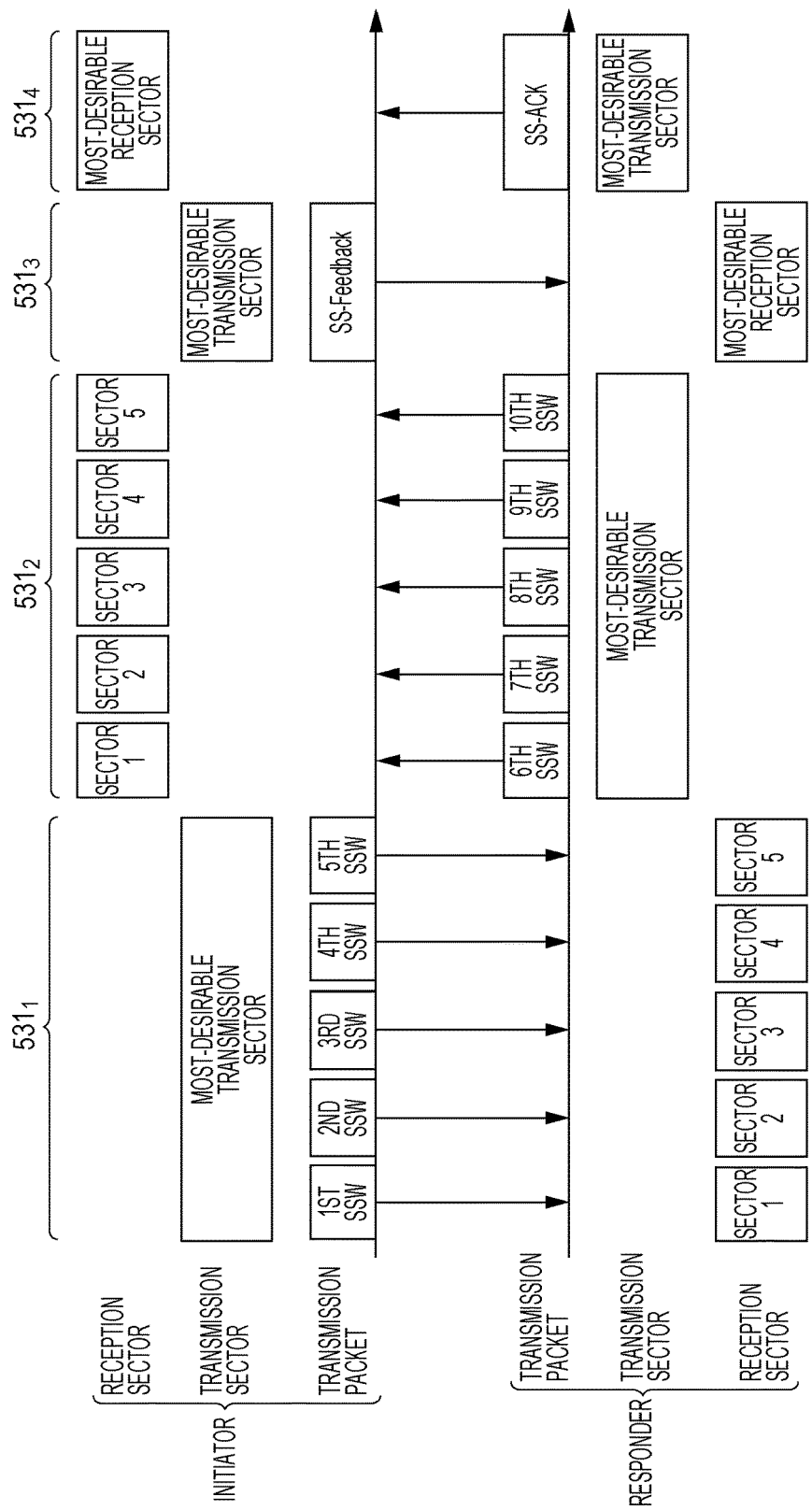
FIG. 5 illustrates how receive sector sweep (RXSS) according to the embodiment is performed as an example.

FIG. 5 illustrates how the RXSS is performed as an example. In FIG. 5, the upper lateral portion indicates a process of the radio communication device 300 or the radio terminal 400 as the initiator, and the lower lateral portion indicates a process of the radio communication device 300 or the radio terminal 400 as the responder. In FIG. 5, the lateral axis serves as a time axis.

As illustrated in FIG. 5, in a first period $531_1$, the initiator sequentially transmits first to fifth SSW packets at predetermined intervals using the most-desirable transmission sector of the initiator, which has been determined in the TXSS. The first to fifth SSW packets may be identical or different.

In synchronization with the transmission timings of the first to fifth SSW packets, the responder receives each SSW packet while switching the reception sector of the responder among the sectors 1 to 5 (see FIG. 2) with high directivity.

That is, the responder receives the first to fifth SSW packets in the sectors 1 to 5, respectively. At this time, the responder measures the respective reception reception qualities of the first to fifth SSW packets, such as the reception power, RSSI, SNR, or SINR.

After that, in a second period $531_2$, the responder sequentially transmits sixth to tenth SSW packets at predetermined intervals using the most-desirable transmission sector of the responder, which has been determined in the TXSS. The sixth to tenth SSW packets may be identical or different.

In synchronization with the transmission timings of the sixth to tenth SSW packets, the initiator receives each SSW packet while switching the reception sector of the initiator among the sectors 1 to 5 (see FIG. 2) with high directivity.

That is, the initiator receives the sixth to tenth SSW packets in the sectors 1 to 5, respectively. At this time, the initiator measures the respective reception reception qualities of the sixth to tenth SSW packets, such as the reception power, RSSI, SNR, or SINR.

After that, in a third period $531_3$, the initiator transmits an SS-Feedback packet using the most-desirable transmission sector of the initiator, which has been determined in the TXSS. The responder receives the SS-Feedback packet using the reception sector used in receiving the SSW packet with the highest reception quality, which is one of the first to fifth SSW packets and hereinafter referred to as the "most-desirable reception sector".

Lastly, in a fourth period $531_4$, the responder transmits an SS-ACK packet using the most-desirable transmission sector of the initiator, which has been determined in the TXSS. The initiator receives the SS-ACK packet using the most-desirable reception sector used in receiving the SSW packet with the highest reception quality, which is one of the sixth to tenth SSW packets.

In this manner, the radio communication device 300 or the radio terminal 400 determines the most-desirable reception sector for the communication between the radio communication device 300 and the radio terminal 400 through the RSXX, and determines the determined most-desirable reception sector as the reception sector used in receiving a radio signal from the radio communication device 300 or the radio terminal 400.

In the state illustrated in FIG. 1, for example, the first radio communication device $300_1$ performs the TXSS and the RXSS with each of the first to third radio terminals $400_1$ to $400_3$ in connecting to the first to third radio terminals $400_1$ to $400_3$. The second radio communication device $300_2$ performs neither the TXSS nor the RXSS with any one of the radio terminals 400. The third radio communication device $300_3$ performs the TXSS and the RXSS with each of the fourth and fifth radio terminals $400_4$ and $400_5$ in connecting to the fourth and fifth radio terminals $400_4$ and $400_5$.

As a result, the communication processor 310 of each radio communication device 300 retains at least the identification information on the radio terminal 400 that is connecting to each radio communication device 300 and the quality information indicating the quality of the communication with the radio terminal 400, that is, the reception quality.

The communication processor 310 outputs the identification information and the quality information to the information sharer 320 as the device information, which indicates the number of the radio terminals 400 that are connecting to the radio communication device 300 and the quality of the radio communication with each radio terminal 400. As described above, the information sharer 320 causes the device information to be recorded in the terminal management table.

The above-described masquerade SLS is implemented by the radio communication device 300 executing the SLS using the identification information on another (the other) radio communication device 300. In this case, the radio terminal 400 that is the communication partner regards the communication with the radio communication device 300 to which the radio terminal 400 is connecting as continuing and performs no reconnection process while the SLS with the other radio communication device 300 is executed.

Thus, when the masquerade SLS has failed, that is, when for example, the ensured quality of the communication between the other radio communication device 300 and the radio terminal 400 is found to be insufficient, the radio terminal 400 can maintain the communication with the original radio communication device 300.

[Terminal Management Table]

A terminal management table is now described in detail.

FIG. 6 illustrates the contents of the terminal management table as an example. Illustrated here are the contents of the terminal management table descriptive of the self device information on the first radio communication device $300_1$ in the state of FIG. 1.

As illustrated in FIG. 6, the terminal management table 540 is descriptive of identification information (device ID) 541 on the radio communication device 300 and identification information (terminal ID) 542 on the radio terminal 400 connecting to the radio communication device 300 as well as a transmission sector 543, RSSI at the time of transmission in each sector 544, a reception sector 545, and RSSI at the time of reception in each sector 546 of each identification information (terminal ID) 542 of the radio terminal 400.

The transmission sector 543 indicates the sector used in transmitting a radio signal to the radio terminal 400 indicated by the terminal ID 542.

The RSSI at the time of transmission in each sector 544 indicates the respective reception qualities, that is, the RSSI of the radio signals transmitted from the radio communication device 300 indicated by the device ID 541 in the sectors 1 to 5, which are measured at the radio terminal 400 indicated by the terminal ID 542.

The reception sector 545 indicates the sector used in receiving a radio signal from the radio terminal 400 indicated by the terminal ID 542.

The RSSI at the time of reception in each sector 545 indicates the respective reception qualities, that is, the RSSI of the radio signals transmitted from the radio terminal 400 indicated by the terminal ID 542, which are obtained in the sectors 1 to 5 of the radio communication device 300 indicated by the device ID 541.

The communication processor 310 determines the sector with the highest communication quality (the highest RSSI) as the transmission sector 543 on the basis of the RSSI at the time of transmission in each sector 544. The communication processor 310 further determines the sector with the highest communication quality (the highest RSSI) as the reception sector 545 on the basis of the RSSI at the time of reception in each sector 546.

Accordingly, in the example of FIG. 6, for example, "SECTOR 1" corresponding to the highest RSSI at the time of transmission 544, "15", is described as the transmission sector 543 of the first radio terminal $400_1$ indicated by the terminal ID 542 as "STA1".

The information sharer 320 acquires the self device information from the communication processor 310 and acquires the other device information from the other devices 300 through the communication processor 310. The information sharer 320 generates the terminal management table 540 described above on the basis of the acquired self device information and retains the generated terminal management table 540. The information sharer 320 shares the terminal management table 540 with the other devices 300.

More specifically, each radio communication device 300 integrates the first to third terminal management tables $540_1$ to $540_3$ generated in the first to third radio communication devices $300_1$ to $300_3$, respectively, to generate an integrated terminal management table and retains the integrated terminal management table.

FIG. 7 illustrates the contents of the integrated terminal management table as an example and corresponds to FIG. 6. The same references are given to the elements that correspond to those in FIG. 6 and explanations of such elements are omitted.

As illustrated in FIG. 7, the integrated terminal management table 550 includes the first to third terminal management tables $540_1$ to $540_3$ generated in the first to third radio communication devices $300_1$ to $300_3$. The first to third radio communication devices $300_1$ to $300_3$ each retain the above-described integrated terminal management table 550 by mutually transmitting the terminal management table 540 of the self device information.

In the second terminal management table $540_2$, the fields other than the device ID 541 are blank. This is because, as illustrated in FIG. 1, none of the radio terminals 400 is connecting to the second radio communication device $300_2$.

For example, the switch determiner 330 refers to the integrated terminal management table 550 and determines whether or not to switch the connection destination of any one of the connecting terminals 400 to one of the other devices 300 and, when the switch is determined, determines to which one of the other devices 300 the connection destination is switched.

[Criteria for Determination of Switch]

The criteria for determining the switch of the connection destination of the connecting terminal 400 are described in detail below.

In the switch determiner 330, a connection switch determination condition, a switch source candidate terminal condition, and a switch destination candidate device condition are preset as the criteria for determining the switch of the connection destination of the connecting terminal 400.

The connection switch determination condition is the condition for determining to switch the connection destination of any one of the connecting terminals 400 to one of the other devices 300. For example, the connection switch determination condition is that the number of the connecting terminals 400 connecting to the radio communication device 300 is three or more.

The switch source candidate terminal condition is the condition for determining the switch source candidate terminal 400. For example, the switch source candidate terminal condition is that the switch source candidate terminal 400 is the connecting terminal 400 that is the lowest in level of the communication quality among the plurality of connecting terminals 400, which use an identical sector, or that when all of the connecting terminals 400 use different sectors, the switch source candidate terminal 400 is the connecting terminal 400 that is the lowest in level of the communication quality.

When the level of the communication quality is low, reception errors may occur while causing increase in resending or decrease in modulation rate and the frequency band may be squeezed, and accordingly the system throughput may be reduced. Besides, the characteristics of the sectors vary. Thus, the system throughput can be enhanced by preferentially maintaining the radio communication with the higher communication quality.

The switch destination candidate device condition is the condition for determining the switch destination candidate device 300 from among the other devices 300. For example, the switch destination candidate device condition is that the number of the connecting terminals 400 connecting to the other device 300 is one or less. The switch destination candidate device condition may include that the switch destination candidate device is one of the other devices 300, whose cell overlaps that of the radio communication device 300 at least partially.

The switch determiner 330 determines whether or not all of the connection switch determination condition, the switch source candidate terminal condition, and the switch destination candidate device condition are satisfied by referring to the integrated terminal management table 550 (see FIG. 7) that the information sharer 320 retains.

When all of the three conditions are satisfied, the switch determiner 330 determines the connecting terminal 400 that satisfies the switch source candidate terminal condition as the switch source candidate terminal 400 and determines one of the other devices 300 that satisfies the switch destination candidate device condition as the switch destination candidate device 300. The switch determiner 330 outputs the switch determination information indicating the result of the determination to the connection switcher 340.

For example, the terminal ID 542 of the first terminal management table 540$_1$ (see FIG. 7) indicates that the first radio communication device 300$_1$ is connected to three radio terminals, that is, the first to third radio terminals 400$_1$ to 400$_3$ (STA1 to STA3). Accordingly, the switch determiner 330 of the first radio communication device 300$_1$ determines that the connection switch determination condition is satisfied.

For example, the transmission sector 543 and the reception sector 545 of the first terminal management table 540$_1$ indicate that the sector 4 of the first radio communication device 300$_1$ is being used by the second and third radio terminals 400$_2$ and 400$_3$ (STA2 and STA3). In the first terminal management table 540$_1$, the values of the RSSI at the time of transmission in each sector 544 and the RSSI at the time of reception in each sector 546 that relate to the sector 4 indicate that the level of the communication quality of the third radio terminal 400$_3$ (STA3) is lower than the level of the communication quality of the second radio terminal 400$_2$ (STA2).

Accordingly, the switch determiner 330 of the first radio communication device 300$_1$ determines that the switch source candidate terminal condition is satisfied and determines the third radio terminal 400$_3$ (STA3) as the switch source candidate terminal 400.

For example, the terminal ID 542 of the second terminal management table 540$_2$ indicates that none of the radio terminals 400 is connecting to the second radio communication device 300$_2$. Accordingly, the switch determiner 330 of the first radio communication device 300$_1$ determines that the switch destination candidate device condition is satisfied and determines the second radio communication device 300$_2$ as the switch destination candidate device 300.

In this manner, for example, the switch determiner 330 of the first radio communication device 300$_1$ outputs the switch determination information, which indicates that the third radio terminal 400$_3$ is determined as the switch source candidate terminal 400 and the second radio communication device 300$_2$ is determined as the switch destination candidate device 300.

[Operation of Device]

The operation of the radio communication device 300 is now described.

Figure 8A:
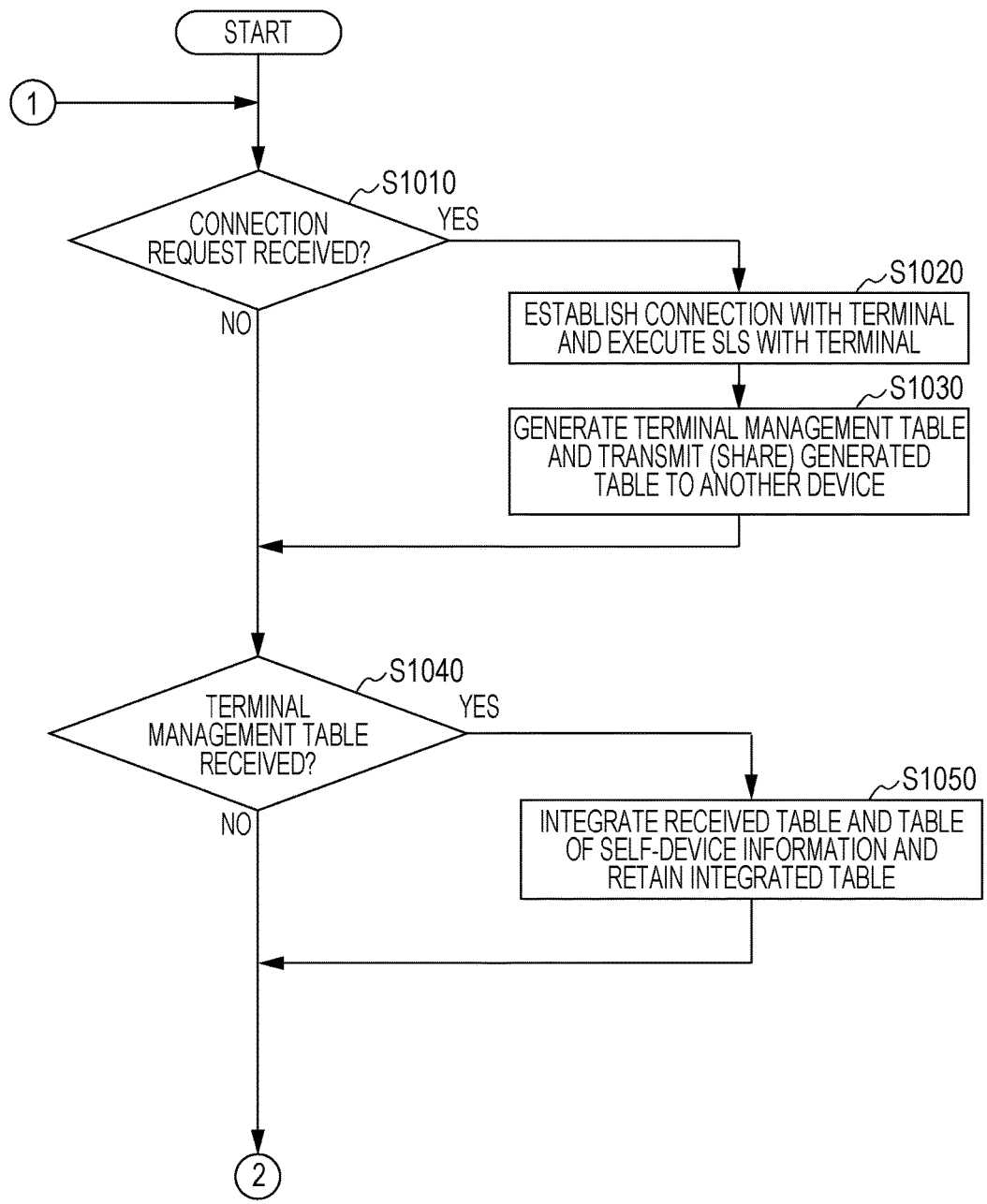
FIGS. 8A and 8B illustrate an example of operation of the radio communication device according to the embodiment.
Figure 8B:
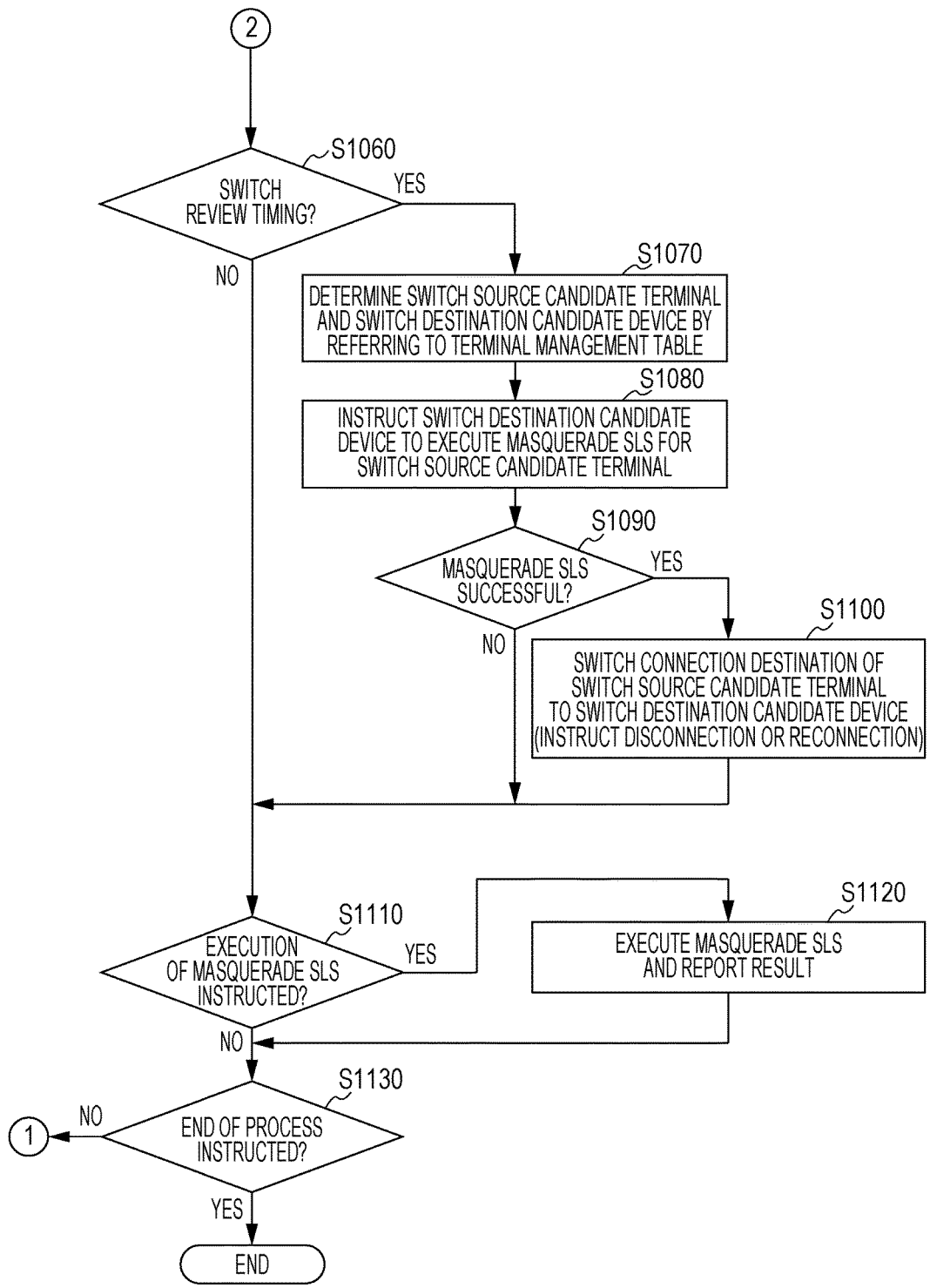

FIGS. 8A and 8B constitute a flow chart that illustrates an example of the operation of the radio communication device 300.

In step S1010, the communication processor 310 determines whether or not the communication processor 310 has received a connection request from the radio terminal 400. When the communication processor 310 has received the connection request (YES in step S1010), the communication processor 310 causes the process to proceed to step S1020. When the communication processor 310 has not received the connection request (NO in step S1010), the communication processor 310 causes the process to proceed to step S1040, which is described below.

In step S1020, the communication processor 310 permits the radio terminal 400 to connect to the communication processor 310 and establishes the connection with the radio terminal 400. After that, the communication processor 310 executes the above-described SLS (see FIGS. 4 and 5) with the radio terminal 400.

In step S1030, the information sharer 320 generates the terminal management table 540 (see FIG. 6) of the self device information acquired through the SLS and records the generated table. Further, the information sharer 320 transmits the generated table to another (the other) device 300. That is, the information sharer 320 shares the self device information with the other device 300.

The information sharer 320 may transmit the terminal management table 540 not only at a timing when the connection with the radio terminal 400 is established but also at a timing when a change occurs in the terminal management table 540 or at periodic timings.

In step S1040, the information sharer 320 determines whether or not the terminal management table 540 of the other device information has been received from the other device 300. When the terminal management table 540 of the other device information has been received (YES in step S1040), the information sharer 320 causes the process to proceed to step S1050. When the terminal management table 540 of the other device information has not been received (NO in step S1040), the information sharer 320 causes the process to proceed to step S1060, which is described below.

In step S1050, the information sharer 320 integrates the terminal management table 540 of the self device information and the terminal management table 540 of the other device information and retains the integrated terminal management table 550 (see FIG. 7).

In step S1060, the switch determiner 330 determines whether or not a switch review timing to review switching the connection destination of the connecting terminal 400 has arrived.

For example, the switch review timing is one of periodic timings, which arrive every minute, a timing at which the level of the communication quality falls below a predetermined value, or a timing at which new one of the radio terminals 400 is connected. The switch determiner 330 determines whether or not the switch review timing has arrived by, for example, monitoring the terminal management table 540 of the self device.

When the switch review timing has arrived (YES in step S1060), the switch determiner 330 causes the process to proceed to step S1070. When the switch review timing has not arrived (NO in step S1060), the switch determiner 330 causes the process to proceed to step S1110, which is described below.

In step S1070, the switch determiner 330 determines the switch source candidate terminal 400 and the switch destination candidate device 300 by referring to the integrated terminal management table 550 (see FIG. 7).

In the examples illustrated in FIGS. 1 and 7, as described above, for example, the switch determiner 330 of the first radio communication device 300$_1$ determines the third radio terminal 400$_3$ as the switch source candidate terminal 400 and determines the second radio communication device 300$_2$ as the switch destination candidate device 300.

When at least one of the connection switch determination condition, the switch source candidate terminal condition, and the switch destination candidate device condition that are described above is not satisfied, the switch determiner 330 may cause the process to proceed to step S1110, which is described below.

In step S1080, the connection switcher 340 instructs the switch destination candidate device 300 to execute the masquerade SLS for the switch source candidate terminal 400. The instruction is performed by, for example, transmitting the switch source candidate terminal information to the switch destination candidate device 300.

The switch source candidate terminal information includes information on the SSW packet used in performing the SLS between the communication processor 310 and the switch source candidate terminal 400. For example, the information on the SSW packet includes at least one of the number of the sectors that the switch source candidate terminal 400 can use, a medium access control (MAC) address of the switch source candidate terminal 400, and a MAC address of the communication processor 310.

For example, the connection switcher 340 may transmit the switch source candidate terminal information by causing the switch source candidate terminal information to be included in an information element of a beacon packet that the communication processor 310 regularly transmits. For another example, the connection switcher 340 may transmit the switch source candidate terminal information by causing the switch source candidate terminal information to be included in a dedicated packet or a data packet.

The connection switcher 340 desirably stops the transmission of the beacon packets while the switch destination candidate device 300 executes the masquerade SLS. Thus, the switch source candidate terminal 400 can receive a beacon from the switch destination candidate device 300 with higher reliability and can enhance stable operation of the network.

The connection switcher 340 may stop the transmission of all the beacon packets or may only stop the transmission of the beacon packets in the sector used for the radio communication with the switch source candidate terminal 400 or in an adjacent sector. Temporarily stopping the transmission of the beacon packets has no immediate effect on the radio communication with the connecting terminal 400.

In step S1090, the connection switcher 340 determines whether or not the switch destination candidate device 300 has succeeded in the masquerade SLS by referring to, for example, the report from the switch destination candidate device 300. When the masquerade SLS has succeeded (YES in step S1090), the connection switcher 340 causes the process to proceed to step S1100. When the masquerade SLS has failed (NO in step S1090), the connection switcher 340 causes the process to proceed to step S1110, which is described below.

When the masquerade SLS has failed, the switch determiner 330 excludes the switch destination candidate device 300 that has failed in the masquerade SLS and searches for the switch destination candidate device 300 that satisfies the switch source candidate terminal condition to set the switch destination candidate device 300 found as a result of the search as the new switch destination candidate device 300. Alternatively, the switch determiner 330 excludes the switch source candidate terminal 400 that has failed in the masquerade SLS and searches for the switch source candidate terminal 400 that satisfies the switch source candidate terminal condition to set the switch source candidate terminal 400 found as a result of the search as the new switch source candidate terminal 400. After that, the switch determiner 330 designates the switch destination candidate device 300 or the switch source candidate terminal 400 that has been newly determined and instructs the execution of the masquerade SLS again.

In step S1100, the connection switcher 340 switches the connection destination of the switch source candidate terminal 400 to the switch destination candidate device 300.

More specifically, the connection switcher 340 transmits a handoff request to the switch source candidate terminal 400 through the communication processor 310 and instructs the switch source candidate terminal 400 to connect to the switch destination candidate device 300 again. The handoff request includes information for efficiently performing the connection with the switch destination candidate device 300, such as the identification information on the switch destination candidate device 300, which is the MAC address or BSSID for example. On receiving the handoff request, the switch source candidate terminal 400 cuts the connection with the communication processor 310 and transmits a connection request based on the above-described information to the switch destination candidate device 300. The connection switcher 340 may cause the communication processor 310 to cut the connection with the switch source candidate terminal 400.

The connection switcher 340 may acquire the quality of the communication between the switch source candidate terminal 400 and the communication processor 310, and the quality of the communication between the switch source candidate terminal 400 and the switch destination candidate device 300, and only when the quality of the communication between the switch source candidate terminal 400 and the switch destination candidate device 300 is favorable, the above-described switch may be performed.

In step S1110, the communication processor 310 determines whether or not one of the other devices 300 instructs the execution of the masquerade SLS. The determination is based on, for example, whether or not the switch source candidate terminal information has been received from the other device 300. When there is an instruction to execute the masquerade SLS (YES in step S1110), the communication processor 310 causes the process to proceed to step S1120. When there is no instruction to execute the masquerade SLS (NO in step S1110), the communication processor 310 causes the process to proceed to step S1130, which is described below.

In step S1120, the communication processor 310 uses the switch source candidate terminal information received from the other device 300 and executes the masquerade SLS. After that, the communication processor 310 reports (transmits) the result of the masquerade SLS, that is, that the masquerade SLS has succeeded or failed to the other device 300 that has made the above-described instruction.

When, for example, the switch source candidate terminal 400 designated according to the switch source candidate terminal information is positioned inside the cell of the communication processor 310 and a sufficient communication quality can be ensured, the masquerade SLS succeeds. When, for another example, the switch source candidate terminal 400 is positioned outside the cell of the communication processor 310 or when no sufficient communication quality can be ensured even while the switch source candidate terminal 400 is positioned inside the cell of the communication processor 310, the masquerade SLS fails.

In step S1130, the communication processor 310 determines whether or not user's operation or the like instructs that the process be ended. When there is no instruction to end the process (NO in step S1130), the communication processor 310 returns the process to step S1010. When the communication processor 310 is instructed to end the process (YES in step S1130), the communication processor 310 ends the whole process.

Through the above-described operation, the radio communication device 300 can switch the connection destinations of the radio terminals 400 in directions where the entire communication quality can be increased, one by one, depending on the situation of the connection between the radio communication device 300 and the other devices 300 and the radio terminals 400 and on change in the connection situation.

[Advantages of Present Embodiment]

As described above, the radio communication device 300 according to the present embodiment is connected to at least one of the plurality of radio terminals 400 as one of the plurality of access points to the communication network 20 by performing radio communication by beam forming. The radio communication device 300 acquires another (the other) device information indicating the situation of the connection between the radio terminal 400 and another (the other) device 300, and in reference to the information, determines whether or not to switch the connection destination of the connecting terminal 400 to the radio communication device 300 from the radio communication device 300 to the other device 300. When it is determined to switch the connection destination of the connecting terminal 400 to the radio communication device 300, the radio communication device 300 switches the connection destination of the connecting terminal 400 to the other device 300.

Thus, the radio communication device according to the present embodiment 300 can determine whether or not to switch the connection destination of the connecting terminal 400 to the other device 300 in accordance with the situation of the connection between the radio terminal 400 and the other device 300.

Accordingly, the radio communication device 300 can determine the switch destination of the connection destination of the connecting terminal 400 while avoiding deterioration in the connection situation of the other device 300, and dispersing load of each access point properly. Specifically, it is possible to avoid, for example, switching the connection destination of the radio terminal 400 to the other device 300 to which a large number of the radio terminals 400 are already connecting, regardless of the presence of another device 300 that is connectable.

That is, when millimeter wave communication is performed at a plurality of access points, the radio communication device 300 can suppress decrease in communication quality even when local concentration of the radio terminals 400 occurs.

When it is determined to switch the connection destination to the other device 300, the radio communication device 300 according to the present embodiment causes the other device 300 to masquerade as the radio communication device 300 and perform the beam forming protocol for the connecting terminal 400. After that, the radio communication device 300 switches the connection destination of the connecting terminal 400 to the other device 300 on condition that the beam forming protocol has succeeded.

Since the directivity is high and a beam is thin in the millimeter wave communication, the radio terminal 400 whose connection destination is determined to be switched may be hindered from establishing the connection with the other device 300 determined as the switch destination. When the beam forming protocol with the other device 300 is performed after cutting the connection with the radio communication device 300 and when the connection with the other device 300 fails to be established, a process of reconnection with the radio communication device 300 needs to be performed again.

In this regard, the radio communication device 300 can determine whether or not it is possible to establish the connection between the radio terminal 400 and the other device 300 while maintaining its own disconnected state, and decrease in the throughput can be suppressed, which is caused in the disconnection process and the reconnection process with the original connection destination.

The radio communication device 300 according to the present embodiment determines whether or not to switch the connection destination of the connecting terminal 400 to the other device 300 in reference to the self device information indicating the situation of the connection between the radio terminal 400 and the communication processor 310.

Thus, when for example, radio communication interference is occurring among the plurality of connecting terminals 400, the connection destination of any one of the connecting terminals 400 can be switched to the other device 300 and the communication quality may be increased.

[Variation of Present Embodiment]

The information sharer 320 may cause the terminal management table 540 to include the radio channel information indicating the radio channel is being used by the communication processor 310, in addition to the information obtained as a result of the SLS. The communication processor 310 may disperse the load of the network through dynamic channel control or uplink power control based on the radio channel information.

Further, the information sharer 320 may cause the terminal management table 540 to include application information, which indicates a type of the data communication performed by the radio terminal 400. The type of the data communication is, for example, file transfer, the Voice over Internet Protocol (VoIP), or streaming. The switch determiner 330 determines the priority for ensuring the communication quality by taking a necessary bandwidth or allowable delay time into account on the basis of the application information, and may determine the switch destination candidate device 300 or the switch source candidate terminal 400 in accordance with the determined priority.

The other device information that the information sharer 320 acquires may only be the number of connections of the radio terminals 400 to the other device 300. That is, the information sharer 320 may only acquire the information necessary for the criteria for determining the switch of the connection destination of the connecting terminal 400.

The millimeter wave communication standard employed for the radio communication device 300 is WiGig in the above-described embodiment but is not limited thereto. For example, the millimeter wave communication standard employed for the radio communication device 300 may be various other radio communication standards with directivity, such as IEEE 802.15.3c. Similarly, the beam forming protocol is not limited to the above-described SLS.

The number and shapes of the beam patterns of the radio communication device 300 are not limited to the example described with reference to FIG. 2.

The connection switch determination condition, the switch source candidate terminal condition, and the switch destination candidate device condition are not limited to the above-described example. For example, the switch destination candidate device condition may be caused to be a condition related to the load on each of the radio communication devices 300 so as not to include the number of connections of the radio terminals 400, and the switch determiner 330 may determine the radio communication device 300 that has the lightest load and is included in the neighboring radio communication devices 300 as the switch destination candidate device 300.

The device information may indicate the reception quality at the radio terminal 400. In this case, the connection switch determination condition and the switch source candidate terminal condition can give a priority to the radio terminals 400 lower in the reception quality so that one of such radio terminals 400 becomes the switch source candidate terminal 400.

Part of the configuration of the radio communication device 300 may be physically separated from the rest of the configuration of the radio communication device 300. In this case, the separated units need to be each provided with a communication circuit for communicating with one another.

Each of the functional blocks used above in describing the present embodiment is typically implemented as large-scale integration (LSI), which is an integrated circuit (IC). The IC may control each functional block used above in describing the present embodiment and may be provided with an input and an output. The ICs may be made individually as single chips, or may be made as a single chip so as to include part or all of the functional blocks. Depending on the degree of the integration, the above-mentioned LSI may be also referred to as an IC, system LSI, super LSI, or ultra LSI.

In addition, the circuit integration is not limited to the LSI, a dedicated circuit or a general-purpose processor may be used for the implementation. A field-programmable gate array (FPGA), which is programmable, or a reconfigurable processor, which is capable of reconfiguring the connection and setting of circuit cells inside the LSI, may be utilized after manufacturing the LSI.

Moreover, when other techniques of circuit integration that replaces the LSI are brought by advance of semiconductor techniques or other derivative techniques, the functional blocks may be integrated by such techniques. Application of biotechnology is possible, for example.

The present disclosure can be represented as a communication control method performed in a radio communication device. Further, the present disclosure can be also represented as a program for causing the communication control method to be operated with a computer. In addition, the present disclosure can be also represented as a recording medium where the program is recorded so as to be readable by a computer. That is, the present disclosure may be represented in any category of devices, methods, programs, and recording media.

[Outline of Present Disclosure]

A radio communication device according to the present disclosure includes: a communication processor that connects to at least one first radio terminal through radio communication using beam forming; an information sharer that acquires first connection information including a connection situation of one or more second radio terminals connected to a second radio communication device; a switch determiner that determines whether or not to switch a connection destination of the at least one first radio terminal from the radio communication device to the second radio communication device in reference to the first connection information; and a connection switcher that, when the switch determiner determines to switch the connection destination, switches the connection destination of the at least one first radio terminal from the radio communication device to the second radio communication device.

In the above-described radio communication device, when the switch determiner determines to switch the connection destination, the connection switcher may cause the second radio communication device to perform a beam forming protocol for the at least one first radio terminal and, after the beam forming protocol succeeds, may switch the connection destination of the at least one first radio terminal from the radio communication device to the second radio communication device.

In the above-described radio communication device, the information sharer may acquire second connection information that includes a connection situation of one or more first radio terminals connected to the radio communication device, the one or more first radio terminals including the at least one first radio terminal, and the switch determiner may determine whether or not to switch the connection destination of the at least one first radio terminal from the radio communication device to the second radio communication device in reference to the second connection information.

In the above-described radio communication device, the first connection information may include at least one of the number of the one or more second radio terminals, communication quality between the second radio communication device and the one or more second radio terminals, and the second connection information may include at least one of the number of the one or more first radio terminals, and communication quality between the radio communication device and the one or more first radio terminals.

In the above-described radio communication device, the information sharer may acquire third connection information that includes a connection situation of one or more third radio terminals connected to a third radio communication device, the switch determiner may determine whether or not to switch the connection destination of the at least one first radio terminal from the radio communication device to the second radio communication device or the third radio communication device in reference to the first connection information and the third connection information, and when the switch determiner determines to switch the connection destination, the connection switcher may switch the connection destination of the at least one first radio terminal from the radio communication device to the second radio communication device or the third radio communication device.

In the above-described radio communication device, the first connection information may include the number of the one or more second radio terminals, the third connection information may include the number of the one or more third radio terminals, when the switch determiner determines to switch the connection destination and the number of the one or more second radio terminal is smaller than the number of the one or more third radio terminals, the switch determiner may determine to switch the connection destination from the radio communication device to the second radio communication device, and when the switch determiner determines to switch the connection destination and the number of the one or more third radio terminal is smaller than the number of the one or more second radio terminals, the switch determiner determines to switch the connection destination from the radio communication device to the third radio communication device.

In the above-described radio communication device, the second information may include communication quality between the radio communication device and the one or more first radio terminals, and the switch determiner may determine to switch the connection destination of the at least one first radio terminal that is lowest in the communication quality of the one or more first radio terminals.

In the above-described radio communication device, the information sharer may transmit the second connection information to the second radio communication device.

A communication control method according to the present disclosure is a communication control method of a radio communication device that connects to at least one first radio terminal through radio communication using beam forming, the method including: acquiring connection information that includes a connection situation of one or more second radio terminals connected to a second radio communication device; determining whether or not to switch a connection destination of the at least one first radio terminal from the radio communication device to the second radio communication device in reference to the first connection information; and when determining to switch the connection destination, switching the connection destination of the at least one first radio terminal from the radio communication device to the second radio communication device.

The radio communication device and the communication control method according to the present disclosure are useful as a radio communication device and a communication control method, which can suppress decrease in communication quality even when local concentration of radio terminals occurs in a case where millimeter wave communication is performed using a plurality of access points.

What is claimed is:

1. A radio communication device comprising:
   a communication processor that connects to one or more first radio terminals through radio communication using beam forming;
   an information sharer that acquires first connection information on the number of one or more second radio terminals connected to a second radio communication device different from the radio communication device;
   a switch determiner that determines, based on the first connection information, whether or not to switch a connection destination of the one or more first radio terminals from the radio communication device to the second radio communication device; and
   a connection switcher that, when the switch determiner determines to switch the connection destination, switches the connection destination of the one or more first radio terminals from the radio communication device to the second radio communication device.

2. The radio communication device according to claim 1, wherein
   when the switch determiner determines to switch the connection destination, the connection switcher causes the second radio communication device to perform a beam forming protocol for the one or more first radio terminals and, after the beam forming protocol succeeds, switches the connection destination of the one or more first radio terminals from the radio communication device to the second radio communication device.

3. The radio communication device according to claim 1, wherein
   the information sharer acquires second connection information on the number of the one or more first radio terminals connected to the radio communication device, and
   the switch determiner determines, based on the second connection information, whether or not to switch the connection destination of the one or more first radio terminals from the radio communication device to the second radio communication device.

4. The radio communication device according to claim 3, wherein
   the first connection information indicates communication quality between the second radio communication device and the one or more second radio terminals, and
   the second connection information indicates communication quality between the radio communication device and the one or more first radio terminals.

5. The radio communication device according to claim 3, wherein
   the second connection information further indicates communication quality between the radio communication device and the one or more first radio terminals, and
   the switch determiner determines to switch the connection destination of one of the first radio terminals that is lowest in the communication quality of the one or more first radio terminals.

6. The radio communication device according to claim 3, wherein
   the information sharer transmits the second connection information to the second radio communication device.

7. The radio communication device according to claim 1, wherein the information sharer acquires third connection information on the number of one or more third radio terminals connected to a third radio communication device, the switch determiner determines, based on the first connection information and the third connection information, whether or not to switch the connection destination of the one or more first radio terminals from the radio communication device to the second radio communication device or the third radio communication device, and when the switch determiner determines to switch the connection destination, the connection switcher switches the connection destination of the one or more first radio terminals from the radio communication device to the second radio communication device or the third radio communication device.

8. The radio communication device according to claim 7, wherein when the switch determiner determines to switch the connection destination and the number of the one or more second radio terminals is smaller than the number of the one or more third radio terminals, the switch determiner determines to switch the connection destination from the radio communication device to the second radio communication device, and when the switch determiner determines to switch the connection destination and the number of the one or more third radio terminals is smaller than the number of the one or more second radio terminals, the switch determiner determines to switch the connection destination from the radio communication device to the third radio communication device.

9. A communication control method of a radio communication device that connects to one or more first radio terminals through radio communication using beam forming, the method comprising:

acquiring first connection information on the number of one or more second radio terminals connected to a second radio communication device different from the radio communication device;

determining, based on the first connection information, whether or not to switch a connection destination of the one or more first radio terminals from the radio communication device to the second radio communication device; and when determining to switch the connection destination, switching the connection destination of the one or more first radio terminals from the radio communication device to the second radio communication device.

* * * * *